US005670725A

United States Patent [19]

Kato et al.

[11] Patent Number: 5,670,725

[45] Date of Patent: Sep. 23, 1997

[54] APPARATUS FOR DIVIDING WIRE COILS

[75] Inventors: Yoshio Kato; Hirozi Itoh, both of Aichi-ken, Japan

[73] Assignee: Daido Steel Co., Ltd., Nagoya, Japan

[21] Appl. No.: 718,742

[22] Filed: Sep. 18, 1996

Related U.S. Application Data

[62] Division of Ser. No. 546,039, Oct. 20, 1995, Pat. No. 5,582,097.

[51] Int. Cl.[6] .......... G01L 1/00

[52] U.S. Cl. .......... 73/862.541; 242/564

[58] Field of Search .......... 73/862.541; 29/407.01, 29/407.08, 412; 242/564; 100/2, 5, 6, 12; 83/14, 23, 950

[56] References Cited

U.S. PATENT DOCUMENTS 3,973,600 8/1976 Choromokos .......... 100/12
4,302,994 12/1981 Kramp et al. .......... 83/23
4,436,574 3/1984 Long et al. .

FOREIGN PATENT DOCUMENTS 2-291364 12/1990 Japan .......... 100/2

*Primary Examiner*—Robert Raevis
*Attorney, Agent, or Firm*—Varndell Legal Group

[57] ABSTRACT

Method and apparatus for dividing wire coils into two wire coils of equal weight or any different weights. A non-bound, loose wire coil is placed on a double screw rod on which two screws of reverse directions of thread are facing in opposite directions at the central turning point of the rod, and the screw rod is rotated to have the screws caused movement of the parts of the wire coil thereon in splitting directions so as to divide the wire coil into two parts at the turning point. The two coil parts thus formed are separated by cutting wire and separately bound to form two wire coils.

7 Claims, 3 Drawing Sheets

APPARATUS FOR DIVIDING WIRE COILS

CROSS REFERENCE TO RELATED APPLICATION

This application is a divisional application of U.S. Ser. No. 08/546,039, filed Oct. 20, 1995, now U.S. Pat. No. 5,582,097.

BACKGROUND OF THE INVENTION

The present invention concerns a method and an for dividing wire coils such as steel wire coils into two or more parts.

The most popular way of producing wire coils of special steels is rolling a steel billet weighing 2 tons into wire and winding the wire to a coil. Depending on the use of the coils there is sometimes demand for coils weighing one ton, so-called "half coil".

To meet this demand it is an easy way to start production from a smaller billet weighing one ton. However, in case where heating prior to wire rolling is carried out in a continuous heating furnace, it is not efficient and advantageous to handle mixed standard two-ton billets and smaller one-ton billets. Thus, the conventional solution is to cope with this problem in the line of wire rolling operation by cutting the wire in the stand series of roughing down rolling—intermediate rolling—finishing rolling, usually between the stands of roughing down rolling and intermediate rolling. Cutting may also be done after finishing rolling and prior to winding or during winding. These solutions are disadvantageous not only because of lowered recovery due to cutting off the ends but because of inevitable rest time in rolling operation.

SUMMARY OF THE INVENTION

A general object of the present invention is, in view of the above circumstances, to provide technology in which wire rolling can be completed by rolling only the standard two-ton billets, and then, by dividing the obtained wire coil into two parts so as to provide the half coils.

A more specific object of this invention is to provide, when necessary in practicing the above technology for dividing wire coils, technology for adjusting the weights of the divided two parts of the coil to equal or any other desired proportion of weights A basic embodiment of the method of dividing wire coils according to the present invention comprises, as illustrated in FIG. 1, placing a non-bound, loose wire coil on a double screw rod on which two screws of reverse directions of thread are facing in opposite directions at the central turning point of the rod so that the wire coil may spread over the turning point; rotating the screw rod in such direction that the threads of the reverse directions cause movement of the wire coil thereon to splitting directions so as to divide the wire coil substantially into two parts at the turning point; cutting the wire to separate the two parts of the coil; and separately binding the two parts to obtain two bound wire coils.

DETAILED EXPLANATION OF PREFERRED EMBODIMENTS OF THE INVENTION

Figure 1:
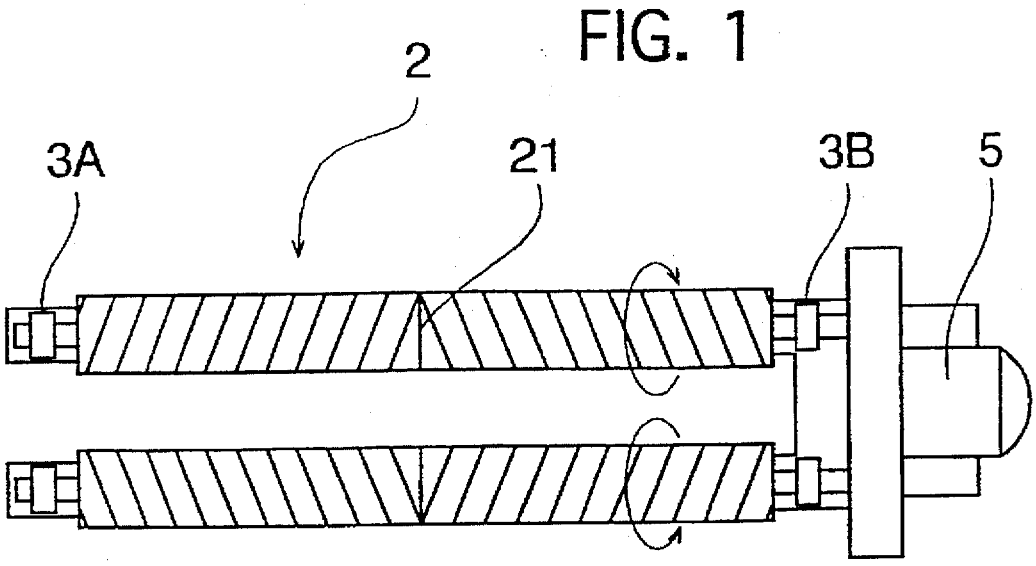
FIG. 1 illustrates a basic embodiment of the apparatus for dividing wire coils according to the invention.
Figure 2:
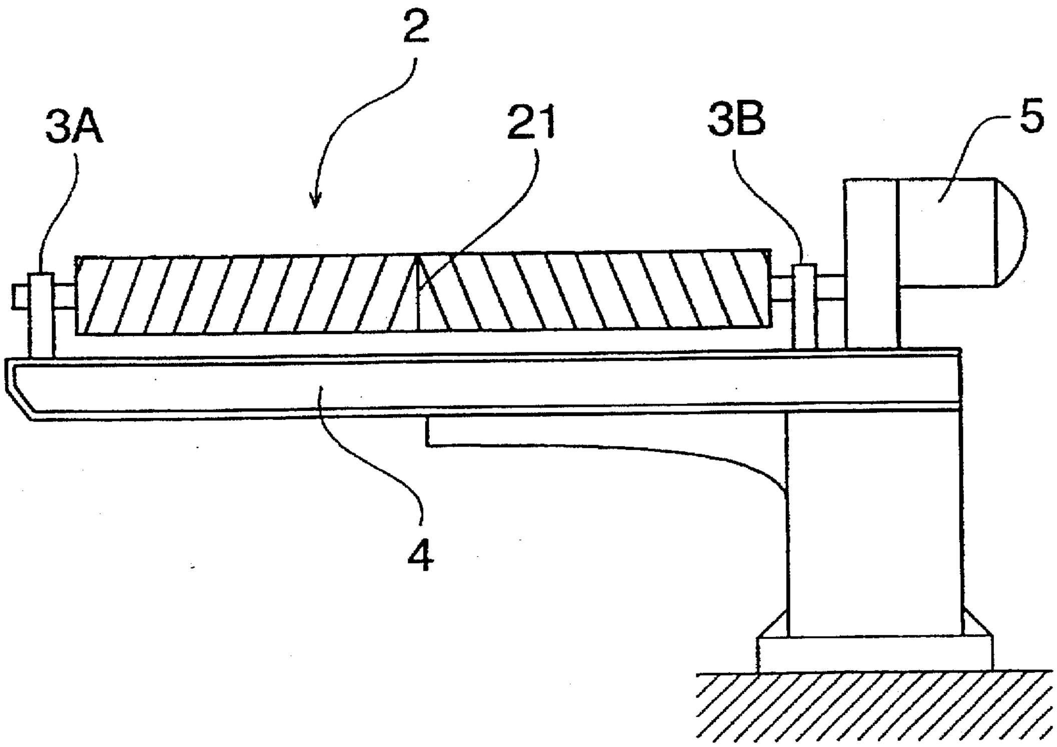
FIG. 2 is a vertical section view of the apparatus shown in FIG. 1.

An apparatus for practicing the above described method of dividing wire coils comprises, as shown in FIG. 1, a double screw rod 2 on which two screws of reverse directions of thread are facing in opposite directions at the central turning point 21 of the rod; bearings 3A, 3B to rotatably support the screw rod at both the ends thereof; a bearing support 4 of such a shape that is fixed to a bed frame at one end thereof and allows coming in and out of wire coils at the other end; and means 5 for rotating the screw.

Figure 5:
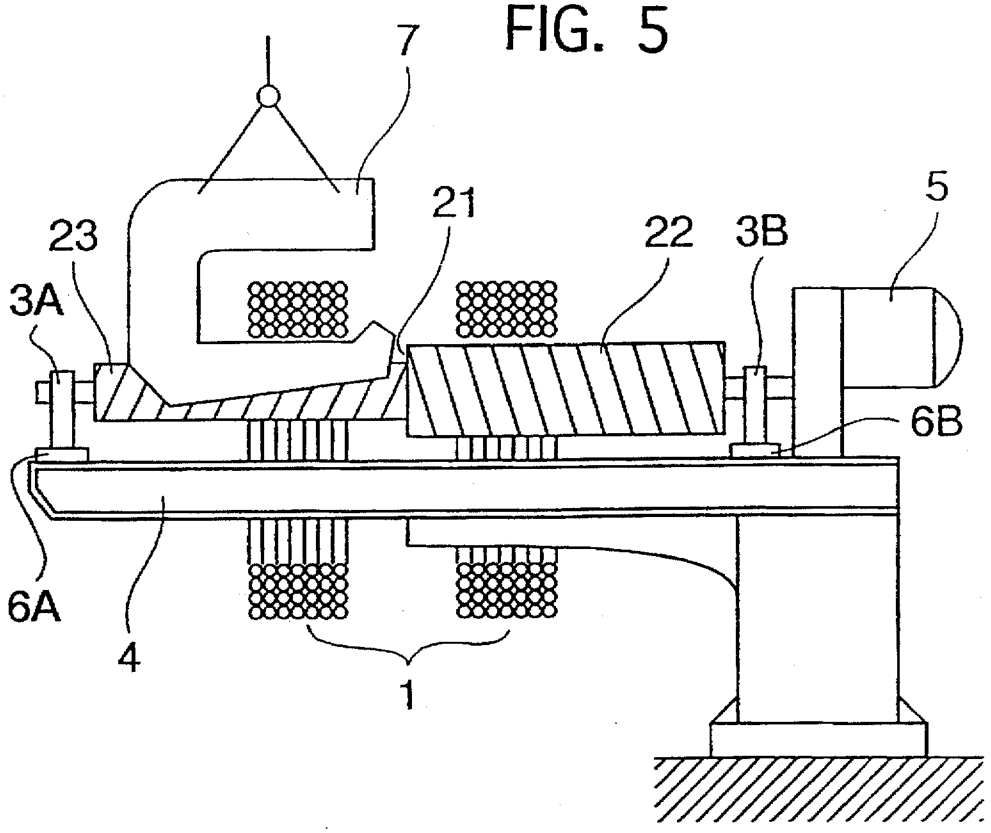
FIGS. 5 and 6 illustrate another embodiment of the apparatus for dividing wire coils according to the invention, equivalent to FIG. 2.

An advanced method of dividing wire coils achieving the above mentioned specific object of the present invention comprises, as shown in FIG. 5, placing a non-bound, loose wire coil on a double screw rod on which two screws of reverse directions of thread and of different thread diameters are facing in opposite directions at the central turning point of the rod and having means for measuring weight of the wire coil so that the wire coil may spread over the turning point; rotating the screw rod in such direction that the threads of reverse directions cause movement of the wire coil thereon to splitting directions so as to divide the wire coil substantially into two parts at the turning point; lifting up one of the coil part with a C-hook, and measuring weight of the other coil part to determine weights of the two coil parts; transferring turns of the wire necessary for equaling the weights of the two coil parts from one to the other; cutting the wire to separate the two coil parts; and separately binding the two coil parts to obtain two bound wire coils.

The apparatus for practicing the above described later method of dividing wire coils comprises, as shown in FIG. 5, a double screw rod 2 on which a screw of a larger diameter 22 a screw of a smaller diameter 23 of reverse directions of thread are threaded adjacent to each other at the center 21 of the rod: load cells 6A, 6B for measuring weights of the parts of the wire coil; bearings 3A, 3B to support the double screw rod rotatably at both the ends thereof; a bearing support 4 of such a shape that is fixed at one end thereof and allows coming in and going out of wire coils at the other end; and means 5 for rotating the screw.

In the apparatus of both the embodiments it is preferable to use two double screw rods arranged in parallel direction, in which directions of the threads of the two screws are reverse in each parallel parts. These screws are rotated in reverse directions, and whereby, the wire coils will not move accompanying rotation of the rods so that the dividing operation may proceed smoothly.

The double screw rod is preferably prepared by inserting a shaft made of steel in a sleeve made of nylon and machining the nylon sleeve to form the threads. Alternatively, screw rods may be made of steel having surface coating with fluorine-resins. Also, screw rods may be made of ductile cast iron.

Figure 3:
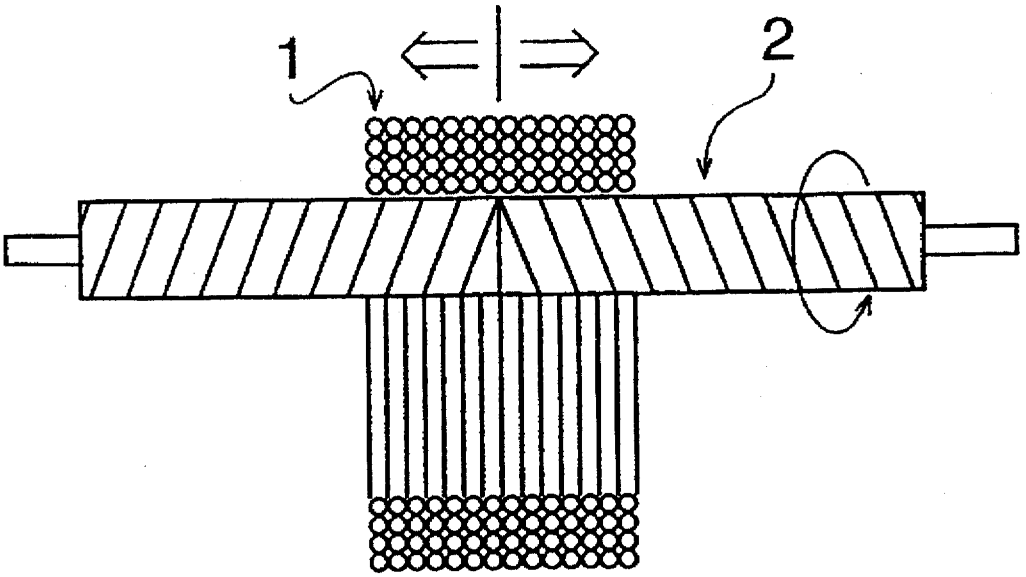
FIG. 3 is to explain principle of dividing wire coils using the apparatus shown in FIG. 1, the step prior to dividing.
Figure 4:
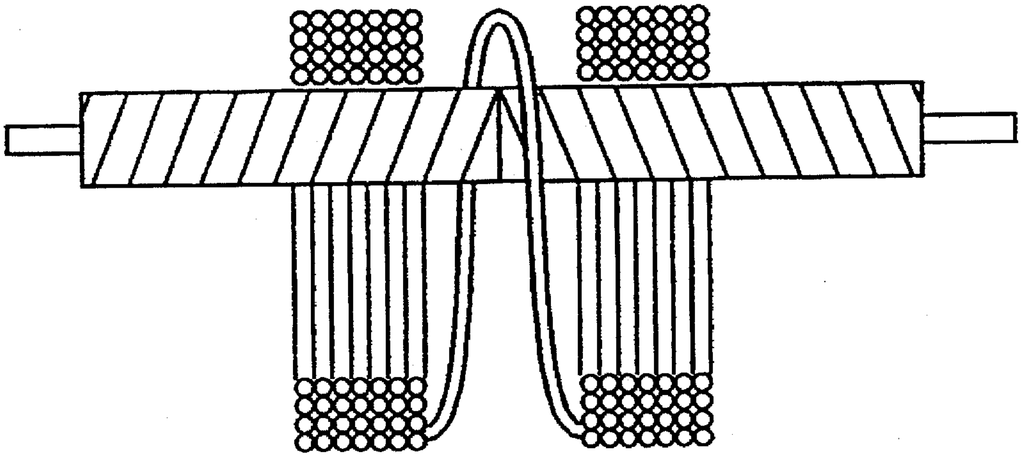
FIG. 4 is, together with FIG. 3, to explain principle of dividing wire coils using the apparatus shown in FIG. 1, the step after dividing.

A wire coil to be divided is lifted up, as it is loose without being bound, with a C-hook and placed on a double screw rod as shown in FIG. 3. Rotation of the double screw rods in the direction noted above causes, due to engagement of inside wires of the coil and the threads of the screws, movement to both the ends of the screw rod or splitting directions, and thus, as shown in FIG. 4, the coil is divided into two parts at the turning point of the rod. Then, wire is cut and two wire coils thus formed are separately transferred with the C-hook to a binding machine for binding.

In the above described operation, if the wire coil is placed on the double screw rod in such a manner that the wire coil spreads over the turning point of the rod at the center of the coil in the longitudinal direction of the rod, then two coils of equal weight can be obtained. If the center of the wire coil is not on the turning point, then two coils of different weights proportional to the lengths of two fractions of the coil in the longitudinal direction of the rod.

It is, however, not easy to actualize desired proportions of weights of wire coil parts and equal weight separation as well. In case where, in accordance with the second method of the invention described above, a double screw rod of different thread diameters is used and, after dividing the wire coil into two parts, the coil part on the smaller diameter screw is lifted with C-hook 7, weight of the coil part on the larger diameter screw can be given by a loadcell. From the balance of the measured weight and the weight of whole the coil, weight of the coil part on the smaller diameter screw may also be calculated. The whole weight of the coil may be previously determined by placing the whole coil on one of the screws of different diameters under which a load cell is provided.

If the weights of the coil parts thus measured are not in accordance with the desired weights, it is possible to realize the desired weight distribution by transferring some turns of the wire from one of the coil part to the other. Weight per one turn of the wire may be readily given by previous measurement or by calculation.

Figure 6:
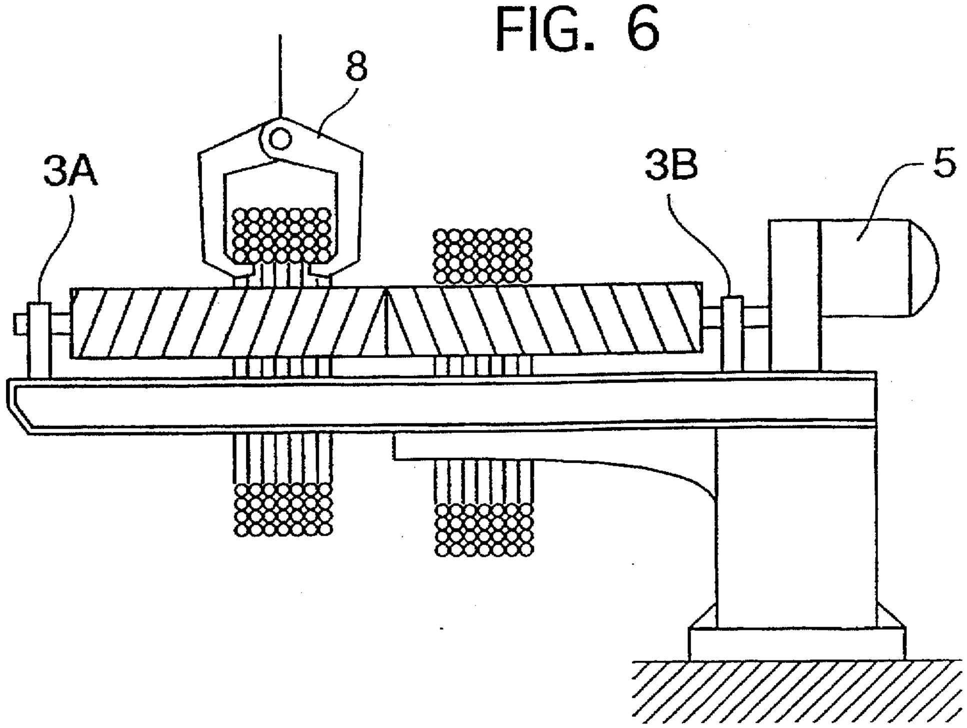

Sometimes it is difficult to lift up the divided coil parts with a C-hook. In such a case, a tongue-type lifting device 8 as shown in FIG. 6 may be used to facilitate separate lifting up of the coil part for weighing and separate transferring. Use of the tongue-type lifting device enables weighing and transferring after division even without using the double screw rod of different thread diameters.

As described above, division of wire coils according to the present invention makes it easy to provide a so-called "half coil" in compliance with use of the wire coils, and thus, prevents decrease in productivity of wire rolling process and inefficient heating of wire coils in continuous heating furnaces.

Particularly, the embodiment where weights of the splitted coil parts are measured, it is easy to divide a wire coil from one steel billet into two coil parts of accurately equal weight or two coil parts of desired weight proportion.

We claim:

1. An apparatus for dividing wire coils comprising:
   - a double screw rod on which two screws of reverse directions of thread are facing in opposite directions at the central turning point of the rod;
   - bearings to rotatably support the screw rod at both the ends thereof;
   - a bearing support of such a shape that is fixed to a bed frame at one end thereof and allows coming in and out of wire coils at the other end; and
   - means for rotating the screw.

2. An apparatus according to claim 1, wherein two double screw rods are arranged in parallel direction; directions of threads of the two screw rods are reverse at each parallel parts; and directions of rotating the two screw rods are reverse.

3. An apparatus according to claim 2, wherein the double screw rod is prepared by inserting a shaft made of steel in a sleeve made of nylon and machining the nylon sleeve to form the threads.

4. An apparatus according to claim 1, wherein the double screw rod is prepared by inserting a shaft made of steel in a sleeve made of nylon and machining the nylon sleeve to form the threads.

5. An apparatus for dividing wire coils comprising:
   - a double screw rod on which a screw of a larger diameter and a screw of a smaller diameter, threads of the two screws being in reverse directions, are facing in opposite directions at the central turning point of the rod;
   - load cells for measuring weights of the parts of the wire coil;
   - bearings to rotatably support the double screw rod at both the ends thereof;
   - a bearing support of such a shape that is fixed to a bed frame at one end thereof and allows coming in and out of wire coils at the other end; and
   - means for rotating the screw.

6. An apparatus according to claim 5, wherein two double screw rods are arranged in parallel direction; directions of threads of the two screw rods are reverse at each parallel parts; and directions of rotating the two screw rods are reverse.

7. An apparatus according to claim 5, wherein the double screw rod is prepared by inserting a shaft made of steel in a sleeve made of nylon and machining the nylon sleeve to form the threads.

* * * * *